United States Patent
Grebe et al.

(10) Patent No.: US 6,176,348 B1
(45) Date of Patent: Jan. 23, 2001

(54) MULTIPLE-PUMP SYSTEM FOR LUBRICATING

(75) Inventors: Karl Grebe, Starnberg; Anton May, Burkardroth; Claus Helbig, Schonungen; Bernd Scheit, Aschach; Stefan Brand, Bad Kissingen; Susanne Bährend, Hammelburg, all of (DE)

(73) Assignee: Perma-Tec GmbH & Co. KG, Euerdorf (DE)

( * ) Notice: Under 35 U.S.C. 154(b), the term of this patent shall be extended for 0 days.

(21) Appl. No.: 09/362,587

(22) Filed: Jul. 28, 1999

(30) Foreign Application Priority Data

Jul. 31, 1998 (DE) ............................... 198 34 599
Oct. 16, 1998 (DE) ............................... 198 47 776

(51) Int. Cl.$^7$ ............................ F16N 13/10; F16N 11/08; F04B 17/00; F04B 19/00; F04B 23/04
(52) U.S. Cl. ......................... 184/27.2; 184/37; 417/415; 417/471; 417/521
(58) Field of Search .................... 184/27.2, 37; 417/415, 417/471, 521

(56) References Cited

U.S. PATENT DOCUMENTS

| | | | |
|---|---|---|---|
| 1,552,068 | * 9/1925 | Lee | 417/415 |
| 1,946,559 | * 2/1934 | Weiskopf | 417/415 X |
| 3,250,931 | * 5/1966 | Hardman | 417/415 X |
| 3,301,197 | * 1/1967 | Dodson et al. | 417/521 |
| 3,515,503 | * 6/1970 | Metheny et al. | 417/415 X |
| 4,534,706 | * 8/1985 | Palm et al. | 417/415 X |
| 6,068,450 | * 5/2000 | Parikh et al. | 417/221 |

FOREIGN PATENT DOCUMENTS

| | | |
|---|---|---|
| 0 586 280 | 3/1994 | (EP) . |
| 62-13781 | 1/1987 | (JP) . |
| 2-1961735 | 8/1990 | (JP) . |

* cited by examiner

Primary Examiner—Charles A Marmor
Assistant Examiner—Roger Pang
(74) Attorney, Agent, or Firm—Herbert Dubno; Andrew Wilford

(57) ABSTRACT

A lubricating system has a housing formed with an intake passage, a drive shaft extending longitudinally in the housing and carrying a plurality of longitudinally spaced worm gears, and respective pumps juxtaposed with the worm gears in the housing. Each pump has a cylinder fixed in the housing, centered on a respective transverse axis, and forming an intake port connected to the passage and an output port. A cavity-forming piston is rotatable about and reciprocal along the respective transverse axis and a worm wheel on the piston meshes with the respective worm gear. An axially projecting cam ramp on the worm wheel is axially engageable with an abutment on the housing. This abutment can be moved axially and for fixing it in any of a multiplicity of positions for varying axial deflection of the piston. A spring bearing against the piston urges the ramp toward the abutment. Rotation of the shaft rotates and reciprocates the piston for drawing in a lubricant at the intake ports and expelling it at the output ports so that the range of axial movement of the piston and the amount of lubricant pumped are determined by the axial deflection of the piston by the ramp.

15 Claims, 6 Drawing Sheets

MULTIPLE-PUMP SYSTEM FOR LUBRICATING

FIELD OF THE INVENTION

The present invention relates to a lubricating system. More particularly this invention concerns a multiple pump arrangement for supplying lubricant to a plurality of different users.

BACKGROUND OF THE INVENTION

Many large pieces of equipment require lubrication at several different points and at different rates at these points. Thus an escalator or conveyor system might require a fairly heavy volume/time rate of lubrication on the main bearings whereas other parts will need regular lubrication but at a much different rate.

The standard system for doing this is to provide a plurality of different pumps all connected to a common drive. In EP 0,586,280 a plurality of axial/rotary piston pumps are connected via respective bevel gears and respective crank linkages to a common drive shaft. Each pump is connected to a respective user. In order to change the output of a given pump, it is necessary to modify the gearing and/or linkage operating it from the drive shaft. To do this the machine must be opened up and parts must be dismounted and exchanged. This is a very difficult operation and largely requires that once the multiple-pump system is set, there is no convenient way to adjust or change any of the outputs. Unfortunately with time it is often necessary to increase the lubrication at some user sites and decrease it at others, something that as mentioned above is quite difficult.

OBJECTS OF THE INVENTION

It is therefore an object of the present invention to provide an improved multiple-pump lubricating system.

Another object is the provision of such an improved multiple-pump lubricating system which overcomes the above-given disadvantages, that is which allows the individual output rates to be adjusted easily and even while the system is running.

SUMMARY OF THE INVENTION

A lubricating system has according to the invention a housing formed with an intake passage, a drive shaft extending longitudinally in the housing and carrying a plurality of longitudinally spaced worm gears, and respective pumps juxtaposed with the worm gears in the housing. Each pump has a cylinder fixed in the housing, centered on a respective transverse axis, and forming an intake port connected to the passage and an output port. A cavity-forming piston is rotatable about and reciprocal along the respective transverse axis and a worm wheel on the piston meshes with the respective worm gear. An axially projecting cam ramp on the worm wheel is axially engageable with an abutment on the housing. This abutment can be moved axially and for fixing it in any of a multiplicity of positions for varying axial deflection of the piston. A spring bearing against the piston urges the ramp toward the abutment. Rotation of the shaft rotates and reciprocates the piston for drawing in a lubricant at the intake ports and expelling it at the output ports so that the range of axial movement of the piston and the amount of lubricant pumped are determined by the axial deflection of the piston by the ramp.

Thus with this system it is possible to displace the abutment to control the throughput of the pump. Such rotary piston pumps are self porting and displace positively so that a very accurate control of flow volume can be achieved. Each pump can be set differently, and the settings can even be changed while the system is running.

For further flexibility the piston has a head axially displaceable in the worm wheel and carrying the cam ramp and the angular position of the head relative to the worm wheel can be changed. In this manner the fluid pulses emitted by the pumps can be spaced apart so that the shaft is subjected to a fairly uniform load. Two pumps can be connected to the same user but set to operate at different times to double flow or provide any required redundancy.

The intake passage extends longitudinally parallel to the drive shaft and the housing has respective output conduits leading from the output ports. Each such conduit is connected to a respective user of a piece of equipment, such as a conveyor or escalator, having multiple points requiring constant lubrication.

Each pump according to the invention has a pin extending generally parallel to the respective axis and having an inner end forming the respective abutment and an external screwthread engaging the housing and forming the means for moving the abutment. The outer end of this pin has a socket or slot so it can be turned by a tool to adjust the respective pump. A lock nut provided on the pin can secure it against drift in the set position.

The springs can bear against the housing or on a more common system where the pumps are arranged in a pair of parallel rows flanking the shaft the springs of one row bear against the springs of the adjacent row, or only a single spring can be set between two oppositely moving but aligned pistons. Each wheel of one of the rows is rotationally coupled to a respective one of the wheels of the other row in one embodiment of such a two-row system. In this case a radially projecting pin offset from the respective axis is provided on each wheel of the one row and projects into the respective wheel of the other row. Alternately each row is engaged by a respective such drive shaft and each drive shaft is provided with a respective drive motor. In the two-row system each piston of one of the rows is coaxial with a respective one of the pistons of the other row.

The lubricating system further has according to the invention a supply of liquid lubricant connected to the intake passage. This supply can be formed by a removable cartridge having a foil-covered end that is automatically pierced by a drain pin when the cartridge is mounted in position. Such a cartridge usually has a sight window to determine its fullness and can usually be replaced while the equipment is operating.

The lubricating system according to the invention further has a controller connected to the drive and to a user to which are connected the output ports for monitoring lubricant need of the user and operating the rotater in accordance therewith. Such a controller can set the lubricating system going whenever the equipment of the user is operating, or can set it to run periodically. The controller can have sensors in the equipment being lubricated to determine lubricant needs and a sensor in the supply to ascertain how much lubricant is available. A nonvolatile memory in the controller can hold information concerning past lubrication and the lubrication needs of the various elements of the equipment connected to the lubricating system.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
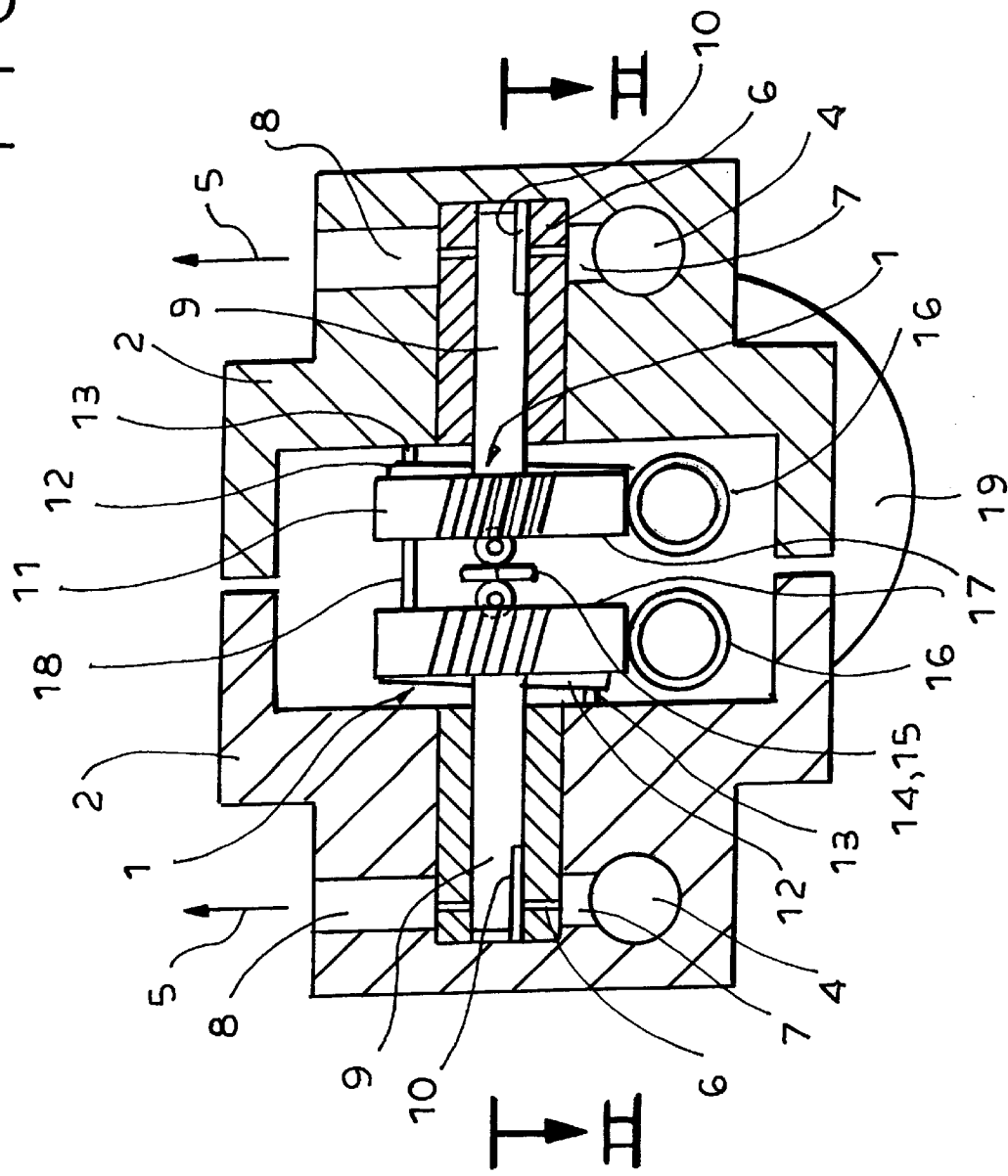
FIG. 1 is a cross section through a lubricating system according to the invention.
Figure 2:
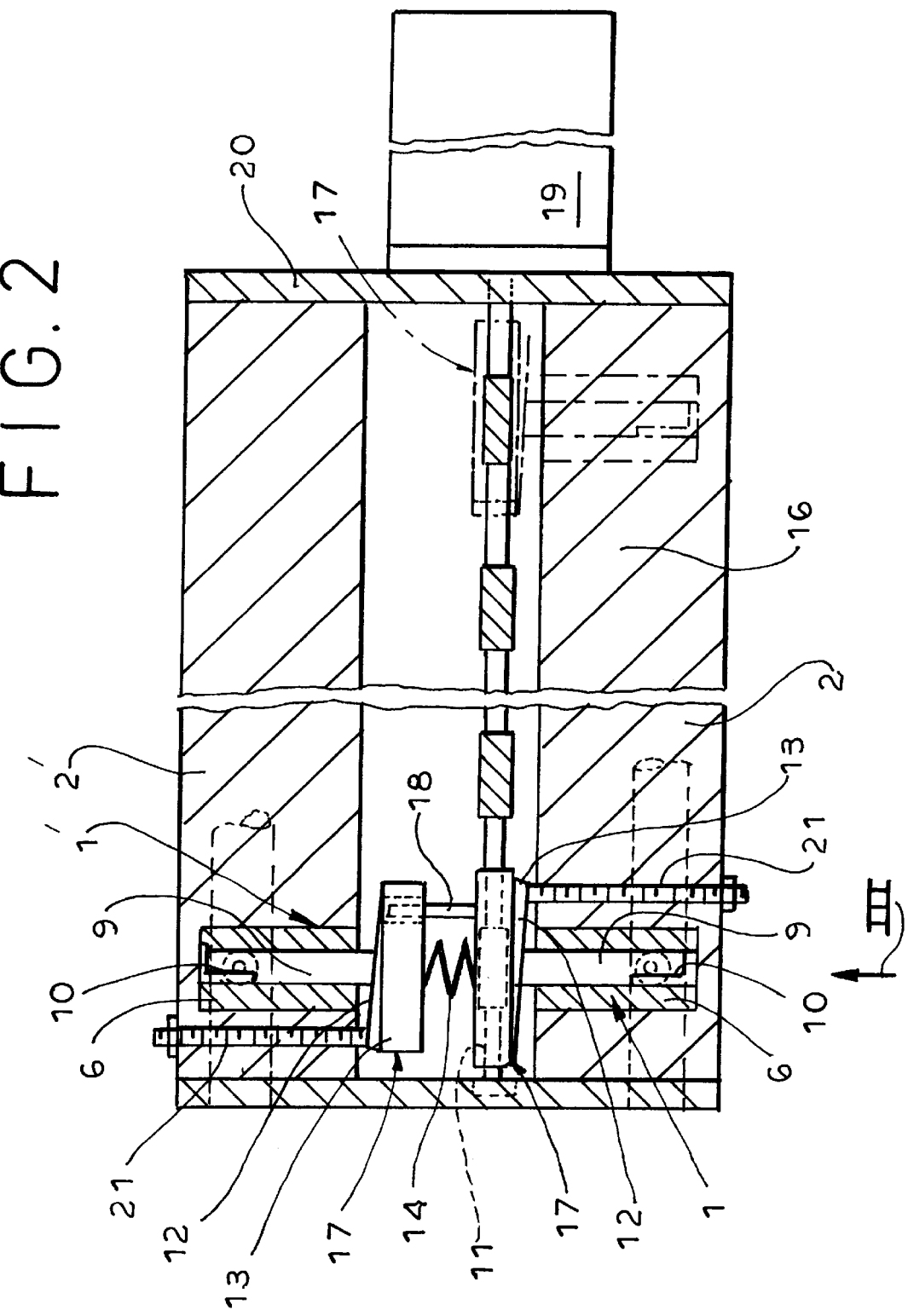
FIG. 2 is a horizontal longitudinal section taken along line II—II of FIG. 1.
Figure 3:
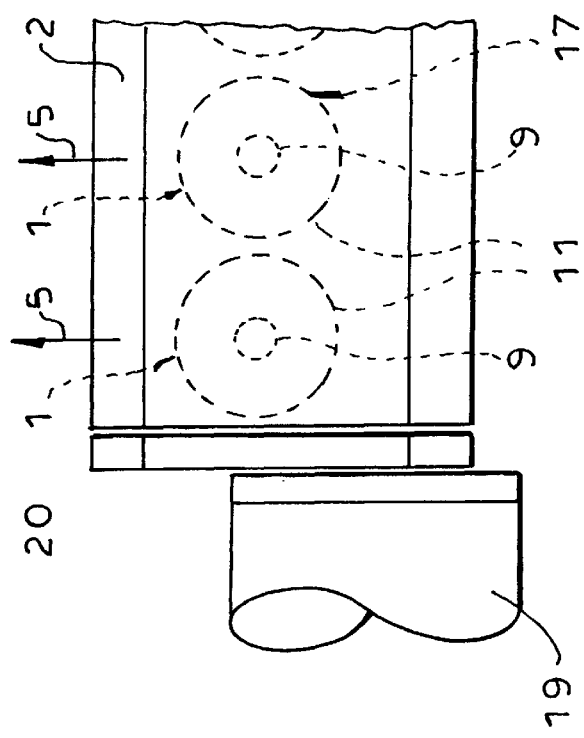
FIG. 3 is a side view taken in the direction of arrow III of FIG. 2.

As seen in FIGS. 1 to 3, a lubricating system according to the invention has two substantially identical rows of substantially identical pumps 1 held in a pair of housings 2 secured together by an end plate 20. The housings 2 form a pair of longitudinally extending intake passages 2 connected to a fluid supply 26 (FIG. 8) and a plurality of different output conduits 5.

Figure 5:
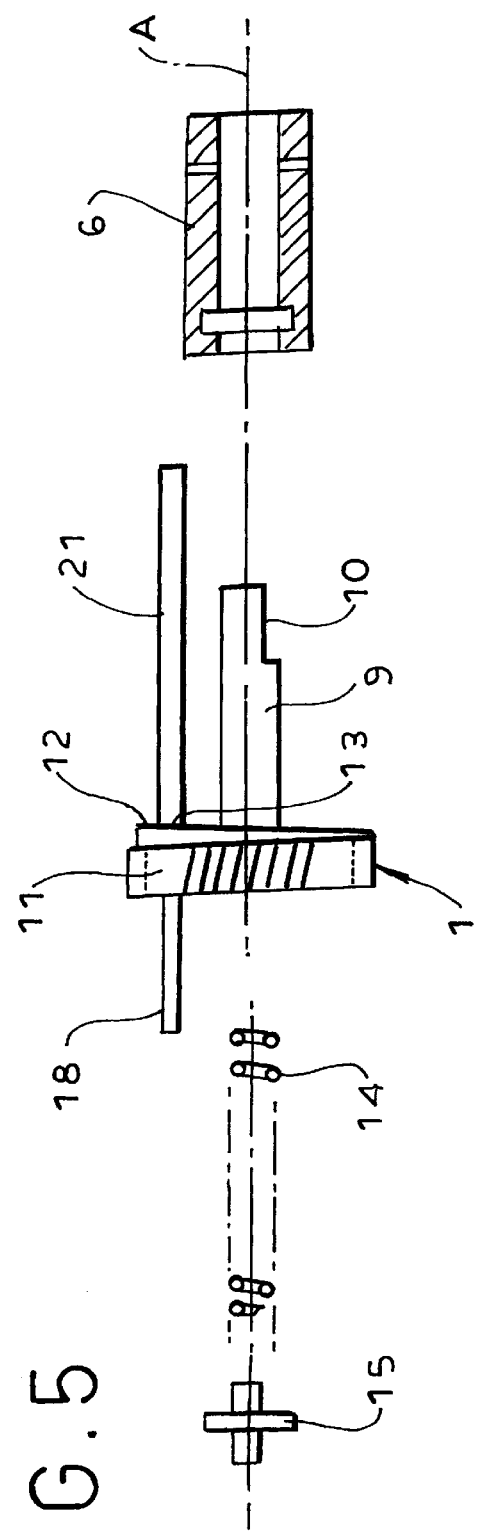
FIG. 5 is an exploded view of the parts of a pump of the system.

Each pump 1 as better shown in FIG. 5 comprises a cylinder 6 seated in the respective housing 2 and formed with an intake port 7 communicating with the intake passage 4 and an output port 8 communicating with the respective output conduit 5. A piston 9 reciprocal along and rotatable about an axis A in the cylinder 6 has an outer end formed with a cavity-forming flat 10 and an inner end formed with a head 17 axially slidable in a ring-type worm wheel 11 meshing with a respective worm gear 17 on a respective shaft 16. Each head 17 is formed with an axially outwardly projecting segmental ramp 12 that rides on a respective abutment 13 formed by the inner end of a threaded rod 21 fixed in the housing 2. The angular position of the ramp 12 can be varied with respect to the respective ring worm wheel 11 by angularly moving the gear 11 relative to the head 17, typically by pushing the gear 11 completely off the head 17 and then resetting it in a different angular position, something fairly simple if they are angularly coupled by axially extending splines. Respective springs 14 urge the pistons 9 and wheels 11 outward and also urge the ramp 12 toward the abutment 13. A fitting 15 between two adjacent wheels 11 allows the two respective springs 14 to bear against each other.

Figure 4:
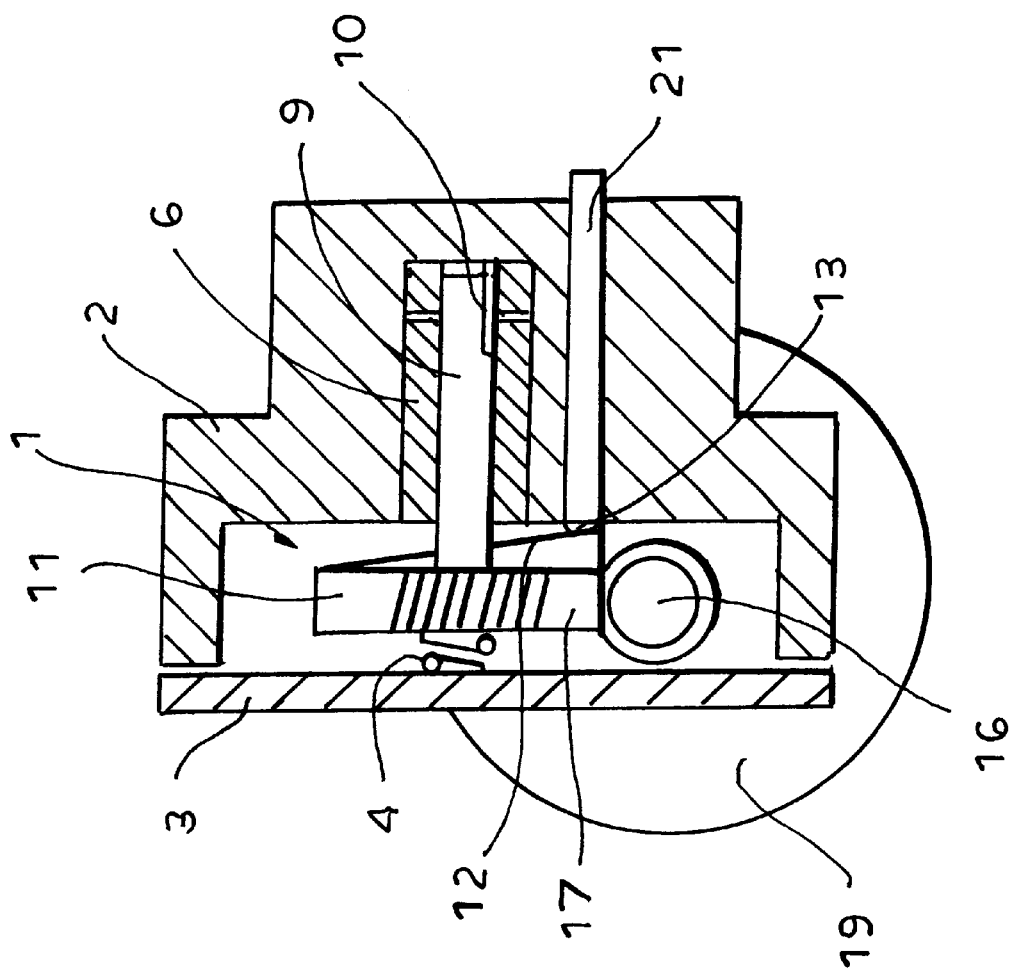
FIG. 4 is a view like FIG. 1 of another system according to the invention.

Instead of two rows of pumps 1, FIG. 4 shows how a single row can be employed. In this case a side plate 3 laterally closes the housing 2. Here the spring 14 bears against a centering bump or pin on the plate 3.

Figure 6:
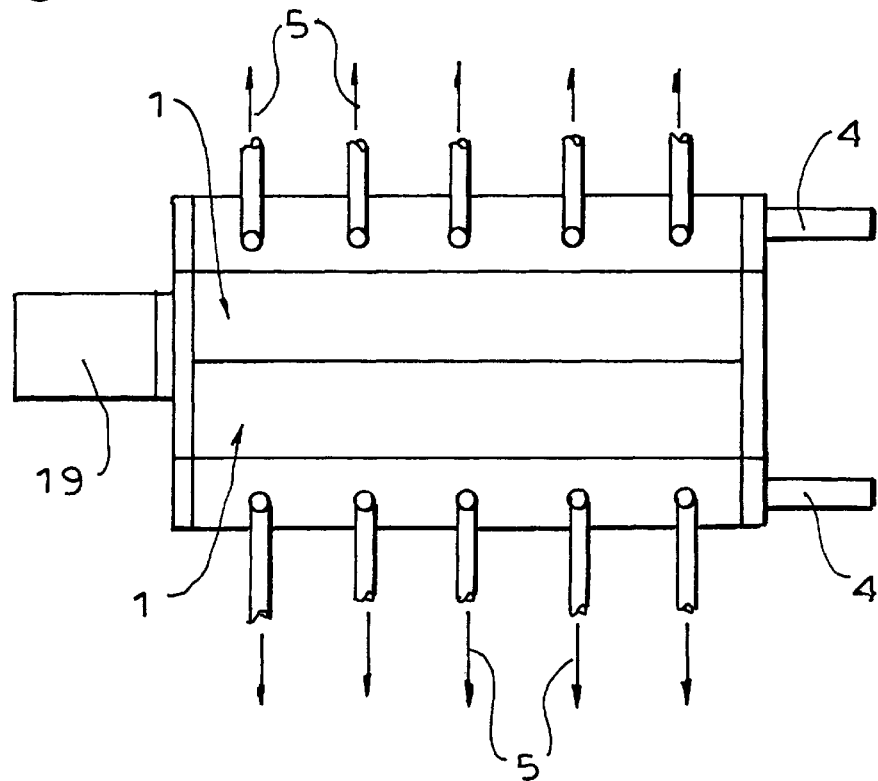
FIG. 6 is a small-scale top view of the system of FIGS. 1 to 3.
Figure 7:
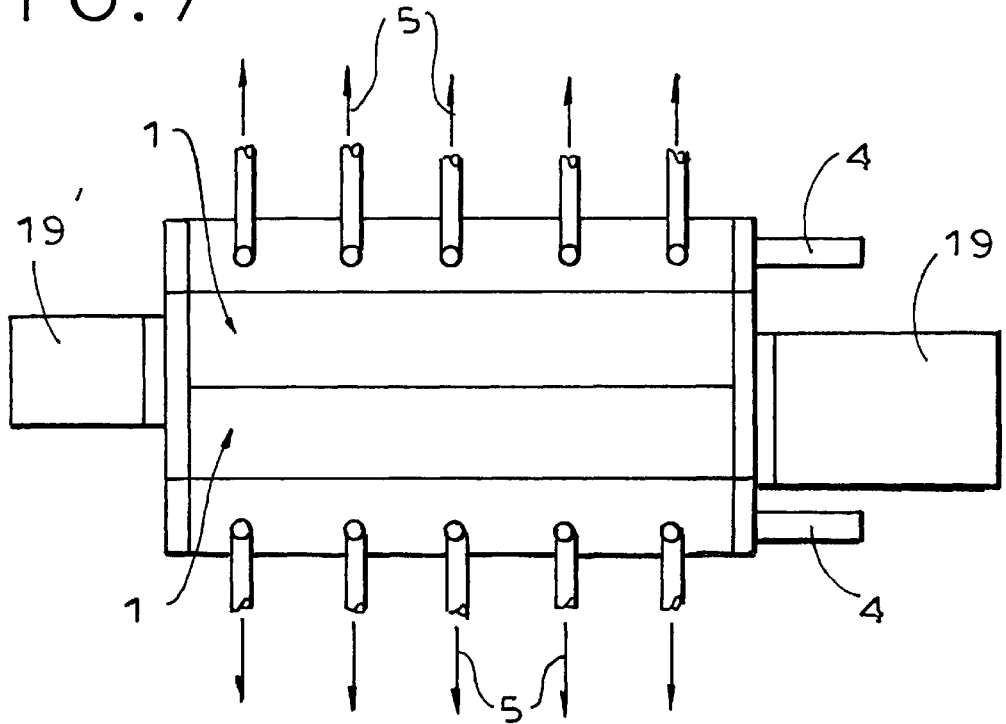
FIG. 7 is a view like FIG. 6 of another system in accordance with the invention.

If only one shaft 16 is provided, an entrainment pin 18 projecting from the wheels on one side can engage in the facing wheels 11 to couple them together. This allows all the pumps 1 to be driven by a single drive motor 19 as shown in FIG. 6. Alternately two separate such motors 19 and 19' as shown in FIG. 7 can be used to rotate the two shafts 17.

Such a pump works on the self-porting principle described in Japanese patent document 62 13771 whereby the edges of the cavity formed by the flat 10, which defines a plane parallel to the axis A but offset therefrom, form intake and output valves as they move across the respective ports 7 and 8. As the piston 9 moves from its starting position inward its cavity is open to the intake port and it sucks in a volume of liquid dependent on the length of its axial movement. The rotation of the piston 9 closes off the intake port and moves the cavity around so it is open into the output port, during which movement it normally passes briefly through a position in which this cavity is open to neither port, making this a positive-displacement pump. As the piston 9 moves subsequently outward, the liquid lubricant in the cavity is forced out the output port 8 while the piston 9 continues to turn until it is in its outermost position and passes briefly through another null position with both ports 7 and 8 closed, and finally it returns to the starting position.

The amount of axial deflection of the piston 9 is determined by how far inward the abutment 13 is advanced. If it is all the way in, the piston 9 has a considerable axial stroke and therefore pumps a maximum amount of lubricant, if it is in an outer position the abutment 13 will merely clip the tip of the saw-tooth shaped ramp 10 briefly for a very short axial stroke and little pumping action.

Figure 8:
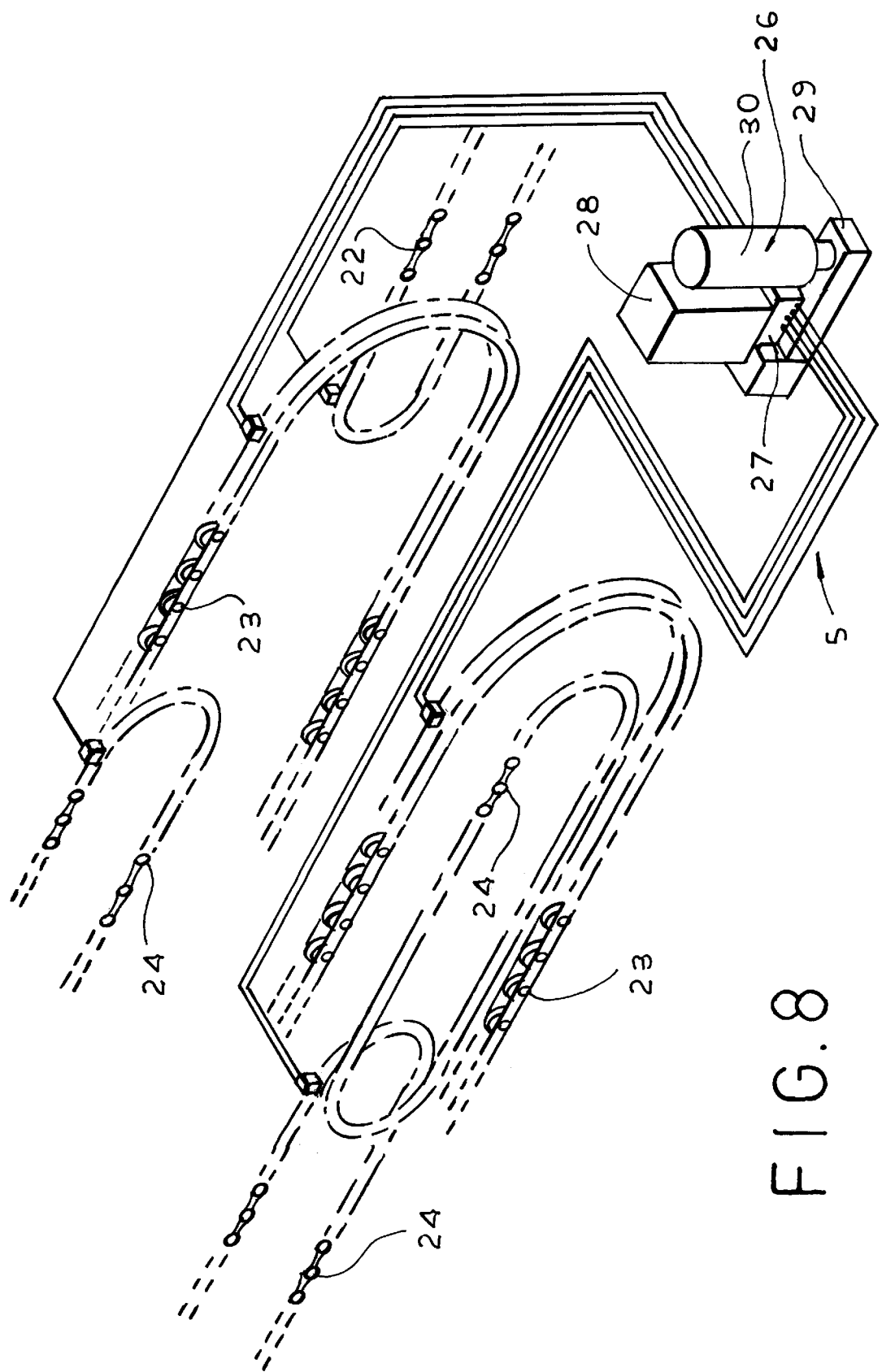
FIG. 8 is a small-scale schematic view illustrating an application of the lubricating system according to the invention.

FIG. 8 shows an escalator system having main drive chains 22, left and right step-drive chains 23, and left and right handrail-drive chains 24, with a coupling chain 25 between them. The pumping system described above is held in a housing 27 secured to a controller 28 and having an extension 29 also carrying the lubricant supply 26 that is formed as a replaceable cartridge 30.

With this system it is relatively easy, working with an oil having a viscosity of 2,200 $m^2$/s according to DIN 51,561 to pump at 40° C. at between 12 and 60 ml/h. At the lowest flow rate the tip of the sawtooth-shaped segmental ramp 12 merely clips the abutment 13 as it passes; at the highest rate the entire axial height of this ramp 12 is used.

What is claimed is:

1. A lubricating system comprising:
   a housing formed with an intake passage;
   a drive shaft extending longitudinally in the housing and carrying a plurality of longitudinally spaced worm gears;
   respective pumps juxtaposed with the worm gears in the housing and each including
      a cylinder fixed in the housing, centered on a respective transverse axis, and forming an intake port connected to the passage and an output port,
      a cavity-forming piston rotatable about and reciprocal along the respective transverse axis,
      a worm wheel on the piston meshing with the respective worm gear,
      an axially projecting cam ramp on the worm wheel,
      an abutment on the housing axially engageable with the ramp,
      means for moving the abutment axially and for fixing it in any of a multiplicity of positions for varying axial deflection of the piston, and
      a spring bearing against the piston and urging the ramp toward the abutment; and
   means for rotating the shaft and thereby rotating and reciprocating the piston for drawing in a lubricant at the intake ports and expelling it at the output ports, whereby the range of axial movement of the piston and the amount of lubricant pumped are determined by the axial deflection of the piston by the ramp.

2. The lubricating system defined in claim 1 wherein the piston has a head axially displaceable in the worm wheel and carrying the cam ramp.

3. The lubricating system defined in claim 2 wherein the angular position of the head relative to the worm wheel can be changed.

4. The lubricating system defined in claim 1 wherein the intake passage extends longitudinally parallel to the drive shaft, the housing having respective output conduits leading from the output ports.

5. The lubricating system defined in claim 1 wherein each pump has a pin extending generally parallel to the respective axis and having an inner end forming the respective abutment and an external screwthread engaging the housing and forming the means for moving the abutment.

6. The lubricating system defined in claim 1 wherein the springs bear against the housing.

7. The lubricating system defined in claim 1 wherein the pumps are arranged in a pair of parallel rows flanking the shaft.

8. The lubricating system defined in claim 7 wherein each wheel of one of the rows is rotationally coupled to a respective one of the wheels of the other row.

9. The lubricating system defined in claim 8 wherein a radially projecting pin offset from the respective axis is provided on each wheel of the one row and projects into the respective wheel of the other row.

10. The lubricating system defined in claim 7 wherein each row is engaged by a respective such drive shaft and each drive shaft is provided with a respective drive motor.

11. The lubricating system defined in claim 7 wherein each spring of the pumps of one of the rows has one end bearing on the respective piston and an opposite end operatively bearing on the spring of a respective one of the pumps of the other row.

12. The lubricating system defined in claim 7 wherein each piston of one of the rows is coaxial with a respective one of the pistons of the other row.

13. The lubricating system defined in claim 1, further comprising
    a supply of liquid lubricant connected to the intake passage.

14. The lubricating system defined in claim 13 wherein the supply is formed by a removable cartridge.

15. The lubricating system defined in claim 1, further comprising
    control means connected to the rotating means and to a user to which are connected the output ports for monitoring lubricant need of the user and operating the rotating means in accordance therewith.

\* \* \* \* \*